US012629695B2

(12) United States Patent
Ribeiro Dias et al.

(10) Patent No.:  US 12,629,695 B2
(45) **Date of Patent:    *May 19, 2026**

(54) MATERIALS PROCESSING IN SOLAR MODULE RECYCLING

(71) Applicant: SOLARCYCLE, Inc., Mesa, AZ (US)

(72) Inventors: Pablo Ribeiro Dias, Mesa, AZ (US); Vicente Schaeffer Vielmo, Mesa, AZ (US)

(73) Assignee: SOLARCYCLE, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/024,991

(22) Filed: Jan. 16, 2025

(65) Prior Publication Data

US 2025/0153187 A1    May 15, 2025

Related U.S. Application Data

(63) Continuation of application No. 18/157,744, filed on Jan. 20, 2023, now Pat. No. 12,285,765.

(51) Int. Cl.
*B03B 9/06* (2006.01)
*B01D 21/26* (2006.01)
(Continued)

(52) U.S. Cl.
CPC .............. B03B 9/06 (2013.01); B01D 21/262 (2013.01); B01D 37/00 (2013.01); B09B 3/35 (2022.01);
(Continued)

(58) Field of Classification Search
CPC .......... B03B 9/06; B09B 3/35; B09B 2101/15
(Continued)

(56) References Cited

U.S. PATENT DOCUMENTS 6,129,779 A  *  10/2000  Bohland ................. C22B 7/006
                                                        241/24.22
12,285,765 B2 *   4/2025  Ribeiro Dias ....... B01D 21/262

FOREIGN PATENT DOCUMENTS

CN          202555405 U  * 11/2012  ............... B03C 7/06
CN          209929333 U  *  1/2020  ............... B09B 3/35
(Continued)

OTHER PUBLICATIONS

Zhanyou; Wang, "High-Voltage Equipotential Electrostatic Separator for Scrapped Photovoltaic Modules" (English Translation), Nov. 28, 2012, worldwide.epsacenet.com (Year: 2012).*
(Continued)

*Primary Examiner* — Molly K Devine

(57) ABSTRACT

Embodiments relate to processing materials in recycling of used solar panels. A used solar panel may comprise components manufactured from materials of high purity, that are expensive to prepare from scratch. Examples of such high purity materials can include but are not limited to: metals (silver; copper; tin; lead), photovoltaic material (e.g., precisely doped crystalline silicon; CdTe), and optically transparent materials (e.g., optical glass; plastics). Accordingly, embodiments recover one or more high purity materials from a starting material pre-processed from a used solar module, by using a recycling process comprising multiple successive separation events. Such events can include, but are not limited to: chemical separation (leaching, filtration, precipitation), physical separation (e.g., shredding/sieving), thermal separation (e.g., furnace heating), and/or electrical separation (e.g., electrowinning, electrostatic). Various fractions separated during the recycling process flow, are enriched in valuable materials and hence available for reuse at lower cost relative to materials prepared from scratch.

20 Claims, 10 Drawing Sheets

(51) Int. Cl.
| | |
|---|---|
| *B01D 37/00* | (2006.01) |
| *B09B 3/35* | (2022.01) |
| *B09B 3/80* | (2022.01) |
| *B09B 101/15* | (2022.01) |
| *C22B 3/06* | (2006.01) |
| *C22B 11/00* | (2006.01) |

(52) U.S. Cl.
CPC ............... *B09B 3/80* (2022.01); *C22B 3/065* (2013.01); *C22B 11/046* (2013.01); *B09B 2101/15* (2022.01)

(58) Field of Classification Search
USPC ........................................................... 209/3
See application file for complete search history.

(56) References Cited

FOREIGN PATENT DOCUMENTS

| | | | | | |
|---|---|---|---|---|---|
| CN | 111957723 | A | * | 11/2020 | ............... B09B 3/40 |
| WO | WO-2017100443 | A1 | * | 6/2017 | ............. C01B 33/02 |

OTHER PUBLICATIONS

Zhu; Jie, "Movable Photovoltaic Module Disassembling and Recycling Device" (English Translation), Jan. 10, 2020, worldwide. espacenet.com (Year: 2020).*

Ma; Yunfeng, "Recovery Method and Device for Broken Glass Photovoltaic Module" (English Translation), Nov. 20, 2020, worldwide. espacenet.com (Year: 2020).*

\* cited by examiner

PV LAMINATE

118

Liquid
Ag, Cu, Sn, Pb

Liquid
Ag, Cu, Sn, Pb

Solid Copper Piece

Solid Copper Piece

Filter

Ag Solid

Filter

Liquid Cu, Sn, Pb

MATERIALS PROCESSING IN SOLAR MODULE RECYCLING

CROSS-REFERENCE TO RELATED APPLICATIONS

The instant nonprovisional patent application is a Continuation of U.S. Nonprovisional patent application Ser. No. 18/157,744 filed Jan. 20, 2023 and incorporated by reference herein for all purposes.

BACKGROUND

As world population increases, the earth is subjected to escalating environmental stress. One form of stress is manifest in rising global temperatures attributable to the burning of fossil fuels in order to provide energy needs.

Alternative energy sources can provide power, while lessening the carbon dioxide burden on the planet. One important source of alternative energy is solar power.

Solar modules are complex manufactured items. They harness the sun's energy and convert it into a usable energy source for residential, commercial and utility-scale applications. As the climate has been significantly impacted by the use of fossil fuels over the past century, the need for alternative sources of energy like solar has taken on greater importance.

Another form of environmental stress imposed upon the earth, is the accumulation and disposal of waste products from human activity. Accordingly, rather than discarding a solar module at the end of its lifetime, it may be desirable to recycle material(s) from a solar module for reuse and thereby avoid deposition in a landfill.

SUMMARY

Embodiments relate to the processing of materials in the recycling of used solar panels. A used solar panel may comprise components manufactured from materials of high purity, that are expensive to prepare from scratch. Examples of such high purity materials can include but are not limited to: metals (silver; copper; tin; lead; others), photovoltaic material (e.g., precisely doped crystalline silicon; CdTe; others), and optically transparent materials (e.g., optical glass; plastics). Accordingly, embodiments recover one or more high purity materials from a starting material preprocessed from a used solar module, by using a recycling process comprising multiple successive separation events. Such events can include, but are not limited to: chemical separation (leaching, filtration, precipitation), physical separation (e.g., shredding/sieving), thermal separation (e.g., furnace heating), and/or electrical separation (e.g., electrowinning, electrostatic). Various fractions separated during the recycling process flow, are enriched in valuable materials and hence available for reuse at lower cost relative to materials that are prepared from scratch.

DESCRIPTION

Solar modules exist in a variety of types and architectures. Examples of such modules can include but are not limited to:

Monocrystalline Solar Panels (Mono-SI)

Polycrystalline Solar Panels (p-Si)

Amorphous Silicon Solar Panels (A-SI)

Cadmium telluride photovoltaics (CdTe)

Copper indium gallium selenide modules (CIGS)

Copper indium selenide modules (CIS)

Concentrated PV Cell (CVP)

Biohybrid Solar modules

Monofacial modules

Bifacial modules

Modules without encapsulant

Silicon heterojunction solar modules tunnel oxide passivated contact solar modules (TOPCON)

passivated emitter and rear contact solar modules (PERC)

Tandem-junction Solar Panels

Perovskite-based Solar Panels

Glass-Backsheet Solar Panels

Glass-Glass Solar Panels

Building-Integrated Solar Panels

Polymer-Based Solar Panels

Solar Roof Tiles

Solar Roof Shingles

Solar modules can last decades, with some degradation in performance over a module's lifetime. Also, solar modules that have been deployed on residential rooftops and other commercial and utility-scale applications for a number of years, may be decommissioned for a variety of reasons.

For example, (residential, commercial, utility) users of solar panels may desire to exchange their modules for newer, higher performing modules in order to maximize the amount of energy obtained from a solar array.

As more solar modules reach the end of their useful lives and/or are relinquished by their owners, it is desirable to dispose of the panels in an environmentally-friendly and economically-feasible way. Alternatively, it may be desired to refurbish and reuse existing solar modules to prolong their lifetimes and reduce cost.

Once it is determined that a solar module is no longer useful to its owner, e.g.:

the module has reached the end of its current deployment due to non- or underperformance, the module has been damaged in transit, or for other (e.g., economic) reasons, in order to avoid discarding the module into a landfill, the module may either be recycled or refurbished and reused.

Accordingly, embodiments implement materials handling in recycling of a photovoltaic module. As described in detail below, such materials handling may comprise multiple successive stages that result in separated fractions that are enriched in valuable metals or purified photovoltaic material.

Figure 1:
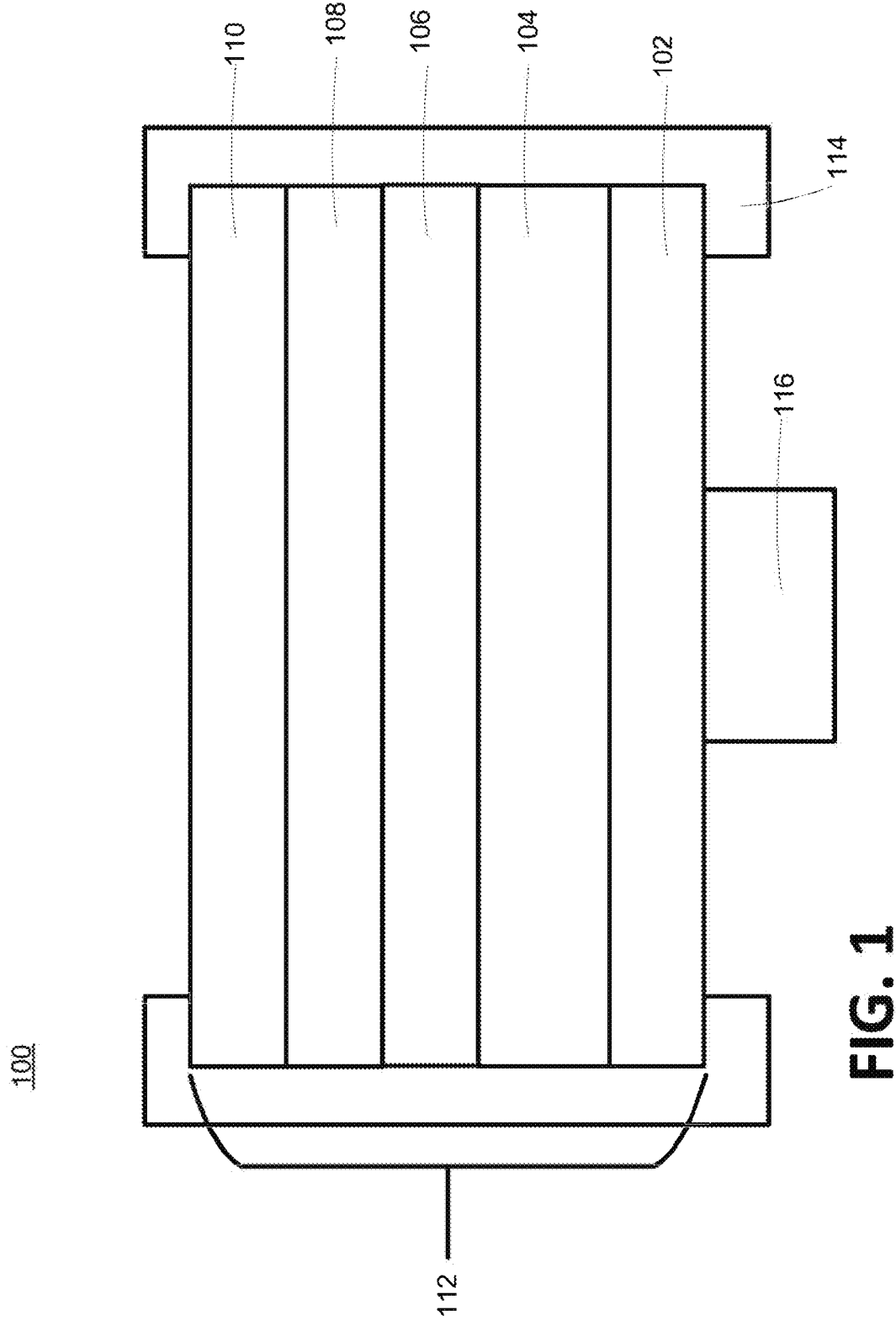
FIG. 1 shows a simplified cross-section of a solar module.

FIG. 1 shows a cross-sectional view of a monofacial solar module in an example.

The PV module 100 is made of different layers assembled into the structure shown in FIG. 1. These layers of FIG. 1 are not drawn to scale.

The layers of FIG. 1 can be simplified as:

substrate (backsheet) 102, back encapsulant 104, e.g., Ethylene-vinyl acetate (EVA), silicone, Polyvinyl butyral (PVB), IONOMER, solar cell 106 comprising PV material (including, e.g., but not limited to: doped single crystal, polycrystalline, or amorphous silicon, Group III-V materials) and metallization, front encapsulant 108, transparent front cover sheet 110 (e.g., typically glass).

This grouping of layers is referred to as a laminate 112.

It is further noted that bifacial modules also exist. Such bifacial modules may exhibit a structure similar to that of FIG. 1, but have a transparent (e.g., glass) layer instead of a backsheet layer. This allows (e.g., reflected) light to enter the module from the back.

The laminate in FIG. 1 is surrounded by a frame 114. The frame may comprise a stiff metal such as aluminum. Alternatively, a frame material may be plastic, comprising e.g., polycarbonate.

A junction box 116 is also part of the module. The junction box may be potted (more common in newer models) or non-potted (more common in older models). In a potted PV junction box, the foils coming out of the solar panel are soldered to the diodes in the junction box, and the junction box is potted or filled with a type of sticky material to allow thermal transfer of heat to keep the solder joint in place and prevent it from falling. Fabrication may take longer but creates a better seal.

In the non-potted PV junction box, a clamping mechanism is used to attach the foil to the wires in the junction box. This can involve a faster assembly, but may not be as robust.

Figure 1A:
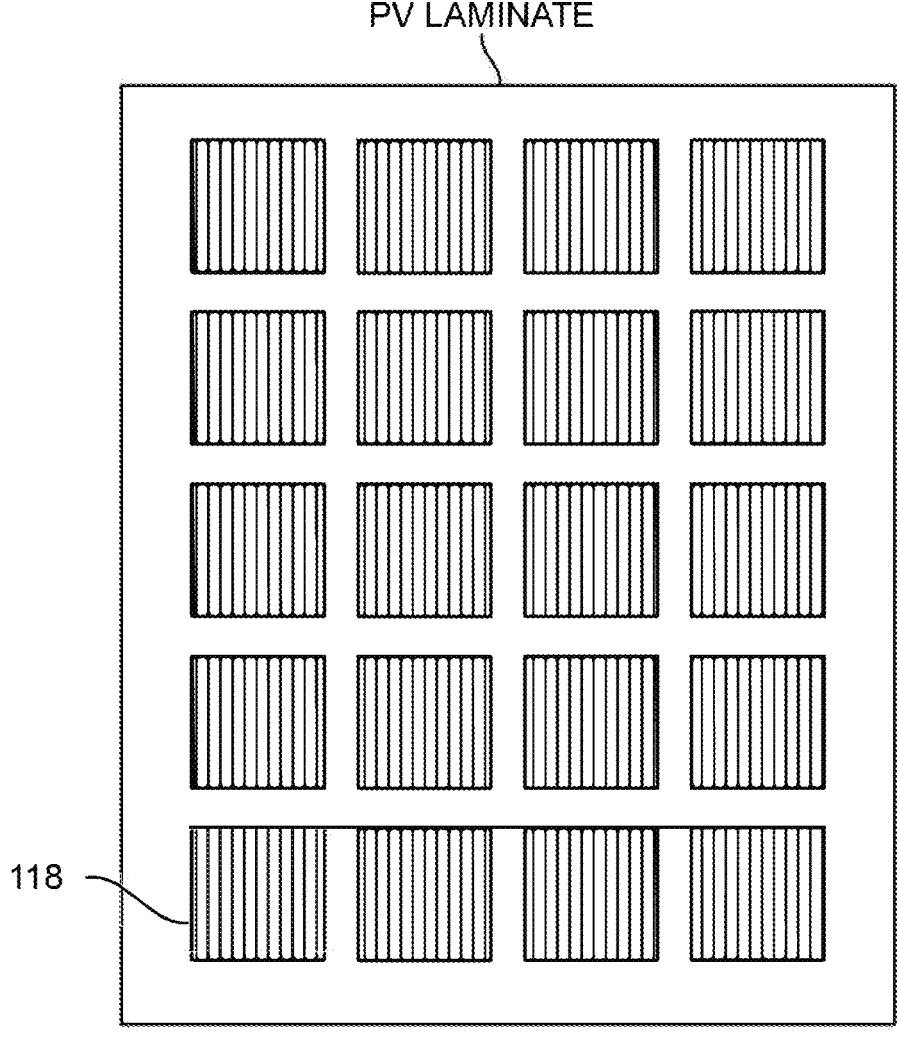
FIG. 1A shows a simplified plan view of a solar module.

FIG. 1A shows a simplified overhead view of the laminate of a solar module, lacking the frame and the top transparent sheet. FIG. 1A shows solar cells including patterned metallization 118, which may comprise, e.g., a valuable metal such as silver.

According to embodiments, material handling of PV modules may be accomplished by processing of the pre-processed form of materials from a used PV module. Such pre-processing can include but is not limited to one or more of:

component (e.g., cabling, junction box, and/or frame) removal shredding delamination (e.g., using thermal processes such as application of a hot wire and/or furnace heating)

separation (e.g., electrostatic separation).

In particular, silicon in relatively pure form may constitute a significant percentage (e.g., between about 50-80% by mass) of the initial result of pre-processing (e.g., shredding followed by electrostatic separation) of a used solar panel.

Other relatively pure materials that are present in the coarsely processed material may include but are not limited to:

silver metal copper metal, lead metal, tin metal, optical glass.

Figure 2:
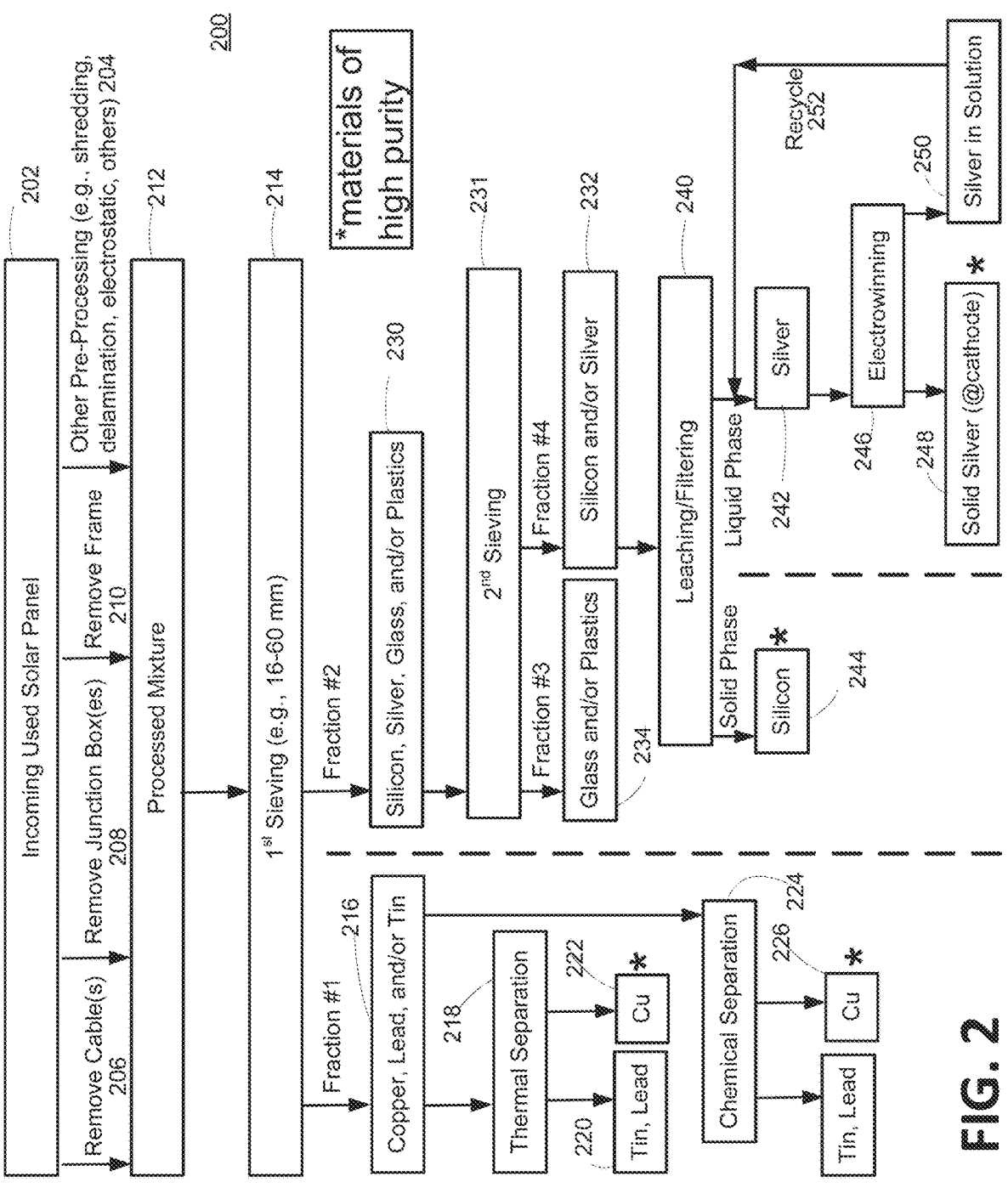
FIG. 2 shows a simplified flow diagram.

FIG. 2 shows a simplified diagram illustrating a process flow 200. A used solar module is received 202. That used solar panel is initially subjected to pre-processing 204.

Such pre-processing can take the form of one or more of:

component removal—e.g., cable removal 206; removal of junction box(es) 208; deframing 210; and/or backsheet removal;

separation—electrical (e.g., electrostatic), physical (e.g., shredding), chemical; and/or delamination, to result in a pre-processed mixture 212.

Such pre-processing can take place in any order. One or more of the stages can be omitted or performed in any combination.

Next, material processing continues by performing a $1^{st}$ sieving 214 of the pre-processed material. Mesh sizes of between about 16-90 mm may be suitable for this $1^{st}$ sieving.

The mesh size can be chosen dependent upon features of a particular size. For example, in some cases silver may be present in a used solar module solely as a thin conducting finger having a particular width. The mesh size may be chosen to allow passage of such a finger, while blocking other materials of features that are typically of a larger size (e.g., aluminum busbars, ribbons, others).

This initial sieving of the pre-processed refined material will physically separate out much of the copper, the tin, and the lead from the rest of the materials. Those other materials can include silicon, silver, glass, and/or plastics.

The fraction #1 216 containing copper, lead and tin may then be exposed to thermal separation 218 heated to separate the tin and the lead 220 from the copper 222. In a particular embodiment, this heating may take place in a furnace. According to some embodiments, the furnace may be heated to around 200 degrees C.

Alternatively or in combination with heating, the metal-containing fraction can be subjected to chemical separation 224 by being placed in a chemical solution to selectively remove tin and lead. One example of such a chemical solution is hydrochloric acid. The solution can then be filtered to obtain purified copper 226.

The fraction #2 230 containing silicon, silver, glass, and/or plastics may be exposed to a $2^{nd}$ sieving 231 in order to separate the silicon and the silver 232 of a fraction #3 from the other materials 234 of a fraction #4.

Next, the remaining fraction #3 comprising silver and silicon, may be leached and/or filtered 240. This leaching may use solutions including one or more of the following, alone or in combination:

inorganic acids (e.g., $HNO_3$, $H_2SO_4$, HCl, HBr, HI, $HClO4$);

aqua regia;

alkali solutions (e.g., aqueous NaOH, KOH, Ca(OH)2);

cyanides (e.g., NaCN, KCN);

thiourea (CS(NH2)2).

Leaching may also employ one or more organic acid(s), including but not limited to: Acetic acid (CH3COOH); Formic acid (HCOOH); Citric acid (C6H8O7); Lactic acid (C3H6O3); Malic acid (C4H6O5); Tartaric acid (C4H6O6); Oxalic acid (C2H2O4); Ascorbic acid (C6H8O6); Succinic acid (C4H6O4); Fumaric acid (C4H4O4); Propionic acid (C3H6O2); Butyric acid (C4H8O2); Benzoic acid (C7H6O2); Salicylic acid (C7H6O3); Phosphoric acid (H3PO4).

Leaching according to embodiments may be conducted in the presence of a variety of other materials, including but not limited to:

oxidizing agents (e.g. Hydrogen peroxide (H2O2), Potassium permanganate (KMnO4), Chlorine (Cl2), Nitrogen dioxide (NO2), Potassium dichromate (K2Cr2O7), Sodium hypochlorite (NaClO), Ozone (O3), Potassium chlorate (KClO3), Ferric chloride (FeCl3), Sodium chlorite (NaClO2), Sodium peroxide (Na2O2), Potassium peroxydisulfate (K2S2O8), Chromic acid (H2CrO4), Permanganate ion (MnO4−); and/or.

complexing agents (e.g. EDTA, DTPA, NTA, CDTA, TETA, DAP, TETA, EDA, TTHA, HEDTA, NOTA, DOTA, TPEN, bipyridine).

Alternatively or in conjunction, other solutions may be used. One example is a sulfate such as Copper (I) Thiosulfate ($Cu_2S_2O_3$).

The leaching solubilizes metals such as silver, but does not solubilize the silicon. This effectively separates the two materials: metals such as silver 242 residing within a liquid phase, and silicon 244 residing within a solid phase.

The resulting mixture is then processed to separate the solid from the liquid phase. This processing may comprise filtering. Filtering can take place using one or more techniques such as:

press filtering, filtering using an inverse rotating screw, and/or filtering using membranes.

Alternatively, or in conjunction with filtering, solid phase may be separated from liquid phase using one or more techniques selected from:

sedimentation and/or decanting;

evaporation;

distillation;

centrifugation.

The resulting solid phase that is separated, may include silicon in high purity form. Such silicon can serve as a starting material to form the PV material of a new solar panel.

The liquid phase that is separated may then be exposed to an electrowinning process 246. Under such electrowinning, silver that is present in solution will undergo reduction and deposit in solid form 248 in the cathode. This allows recovery of high purity silver.

The liquid phase comprising remaining silver in solution 250 can then be recycled 252 and mixed again with another incoming batch of silver-silicon mixture. This enriches its silver content, allowing for the recovery of additional silver in subsequent electrowinning.

While separate, dedicated tools may be used for one or more of the material handling activities described herein, this is not required. Certain embodiments may combine multiple functionality in a single tool.

For example, particular embodiments could perform both pre-processing and one or more downstream separation steps.

Some embodiments could perform multiple physical separation steps (e.g., shredding, sieving). Certain embodiments may perform both physical and chemical separation steps.

It is emphasized that the approaches described above may be utilized alone, or in various combinations, in order to effect the recycling.

Figure 3:
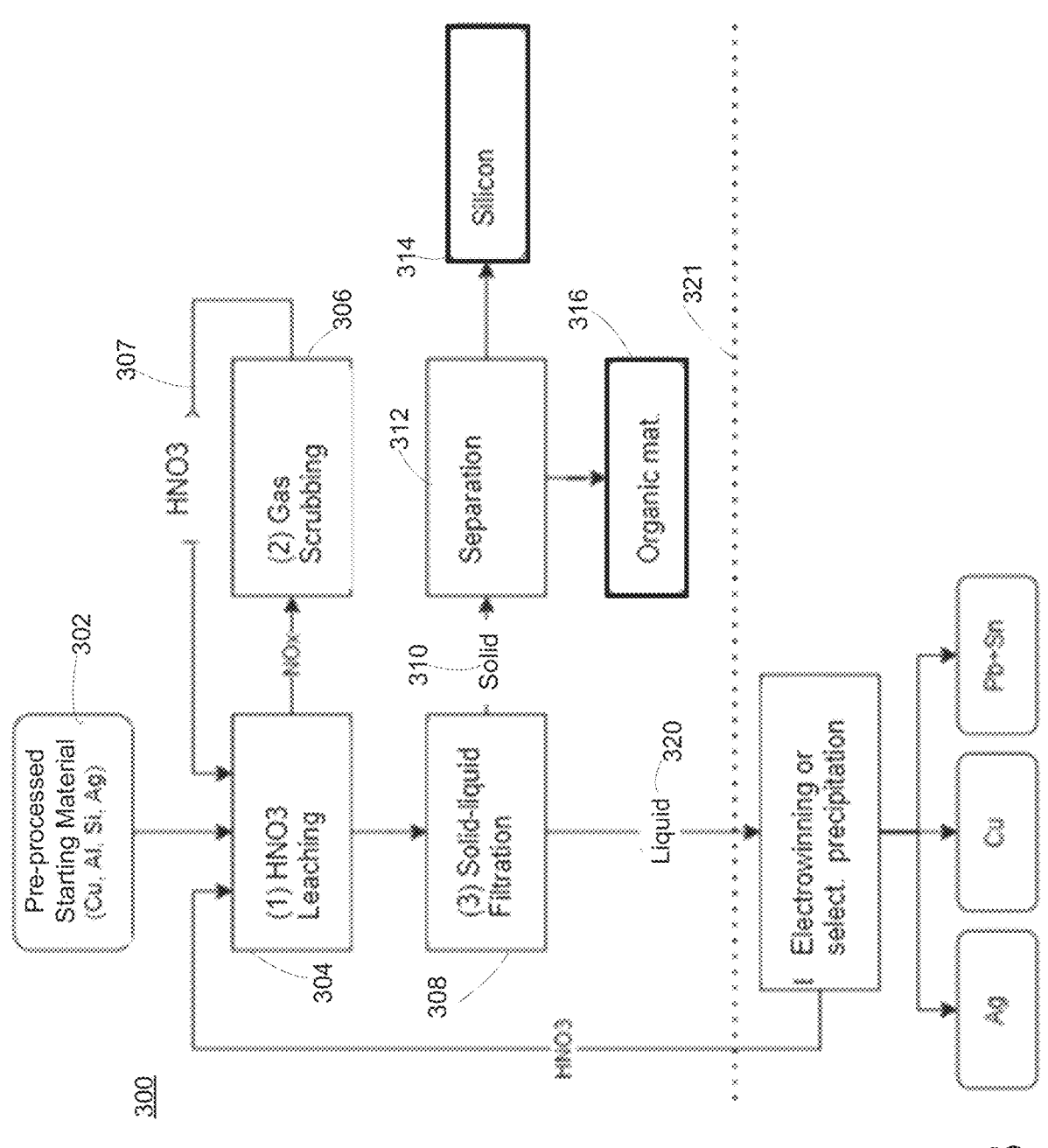
FIG. 3 shows a simplified flow diagram according to an example.
Figure 4:
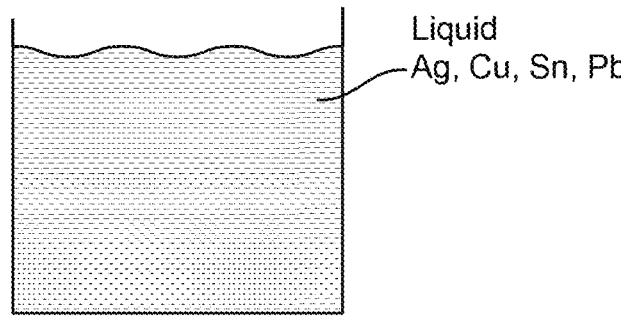
FIGS. 4-7 show simplified views illustrating the chemical separation of silver from a liquid fraction by selective precipitation.
Figure 5:
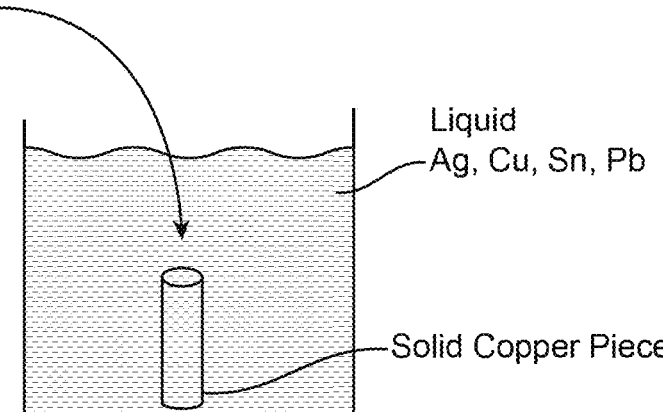
Figure 6:
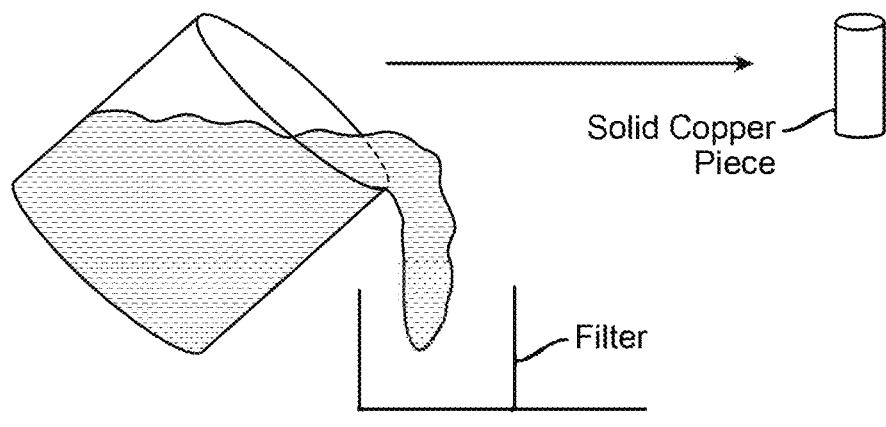
Figure 7:
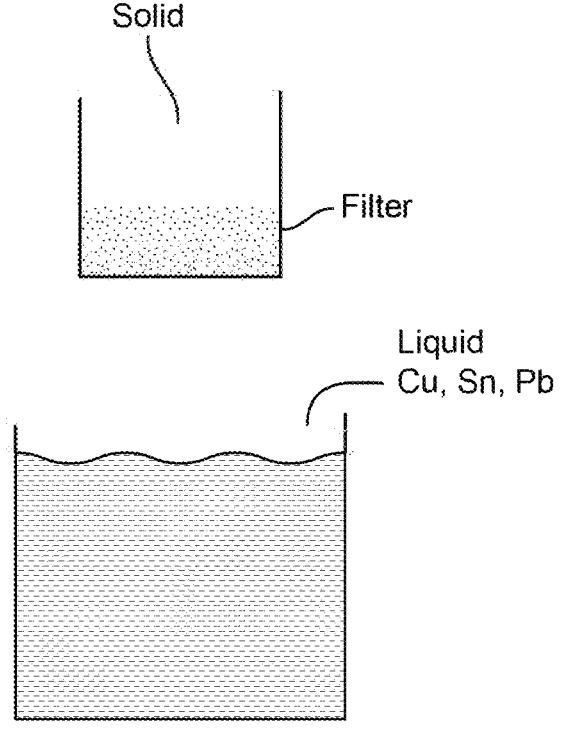

An alternative embodiment is shown in the simplified flow diagram 300 of FIG. 3. Specifically, a starting material resulting from pre-processing of a used solar panel, is provided 302.

This starting material may result from initial processing of a used solar panel to remove cables/junction box/frame, followed by shredding and electrostatic separation. This pre-processed starting material may have the composition (in weight %) shown in Table 1.

TABLE 1

| Glass | 25% | 8% | 0% |
|---|---|---|---|
| PV material | 85% | 59% | 48% |
| Polymer | 10% | 2% | 0% |
| Ag Metal | 2% | 1% | 0.2% |
| Cu Metal | 30% | 27% | 3% |
| Pb Metal | 2% | 1.5% | 1% |
| Tin Metal | 2.5% | 1.8% | 0.1% |
| Other | 3% | 1% | 0% |

Next, the pre-processed starting material is exposed to a liquid during a leaching process 304. Such liquids can include one or more of:

inorganic acids (e.g. HNO3, H2SO4), aqua regia,

HCl, alkali solutions (e.g., aqueous NaOH and/or KOH), copper (I) Thiosulfate (Cu2S2O3).

In some embodiments, this liquid may comprise nitric acid HNO3. As described in the example below, a gas scrubbing 306 (e.g., of NOx gas) may be employed, with the HNO3 fed back 307 into the leaching.

Following the leaching, a solid-liquid filtration 308 takes place. The solid fraction 310 resulting from the filtering, may have the following composition by weight % as shown below in Table 2.

TABLE 2

| Glass | 50 | 20 | 0 |
|---|---|---|---|
| PV material | 62.2 | 57 | 49.8 |
| Polymer | 48.5 | 41.6 | 36.8 |
| Ag Metal (trace) | 0.05 | 0.03 | 0.02 |
| Cu Metal (trace) | 0.04 | 0.03 | 0.03 |
| Pb Metal (trace) | 0 | 0 | 0 |
| Tin Metal(trace) | 0.05 | 0.04 | 0.04 |
| Cr | 0.02 | 0.01 | 0.00 |
| Ti | 0.02 | 0.01 | 0.01 |
| Ca | 0.23 | 0.19 | 0.14 |
| K | 0.11 | 0.07 | 0.00 |
| P | 0.40 | 0.34 | 0.29 |
| Cl | 0.03 | 0.01 | 0.00 |
| S | 0.11 | 0.10 | 0.09 |
| Other | 0.91 | 0.73 | 0.52 |

That solid fraction is then is subjected to a further separation process 312. This results in a PV-containing fraction 314 and an organic material-containing fraction 316.

Composition of the PV-containing fraction 314 may be characterized by Table 3 below.

TABLE 3

| Glass | 50 | 3 | 0 |
|---|---|---|---|
| PV material | 100 | 91.6 | 80.0 |
| Polymer | 20 | 8.4 | 0 |
| Other (trace) | 1.0 | 0.9 | 0 |

This fraction is enriched in costly PV material in pure form. It can be subjected to further processing to create a new solar module that includes recycled material.

Composition of the organic material-containing fraction 316 may be characterized by Table 4 below.

TABLE 4

| Glass | 20 | 8 | 0 |
|---|---|---|---|
| PV material | 24 | 14.1 | 0 |

7

TABLE 4-continued

| Polymer | 100 | 85.9 | 76 |
|---|---|---|---|
| Other (trace) | 1.0 | 0.9 | 0 |

This fraction contains mostly polymer material (e.g., encapsulant and/or backsheet). According to some embodiments, this fraction can be discarded.

Handling of the liquid fraction 320 remaining after the filtering (shown as occurring below the dashed line 321 of FIG. 3), is now discussed. In particular, the composition of liquid fraction may be characterized by Table 5 below (in weight % unless otherwise indicated).

TABLE 5

| Ag Metal | 0.5 | 0.04 | 0 |
|---|---|---|---|
| Cu Metal | 25.75 | 2.29 | 0.01 |
| Pb Metal | 1.55 | 0.14 | 0.02 |
| Tin Metal | 1.7 | 0.12 | 0 |
| Fe | 0.80 | 0.06 | 0 |
| Al | 2.10 | 0.17 | 0.02 |
| Solution Concentration | 15 mol/L | 1 mol/L | 0.45 mol/L |

This liquid fraction may then be subjected to further processing in order to separate out the relative components in purified form. Such components can be recovered in a variety utilizing a variety of approaches (employed alone or in various combinations).

electrowinning, selective precipitation by substitution, selective precipitation by adding salts, biosorption, solvent extraction, and/or ionic exchange.

According to specific embodiments, selective precipitation can be achieved through substitution by first introducing solid copper to the liquid solution. The copper piece should be 10% in weight of the total weight of the liquid.

This will cause silver to precipitate. The solution could then be filtered.

Powder obtained from the filtering will be enriched in silver. Leftover copper will be in a single piece. FIGS. 4-7 show simplified views illustrating the chemical separation of silver from a liquid fraction by selective precipitation.

Figure 8:
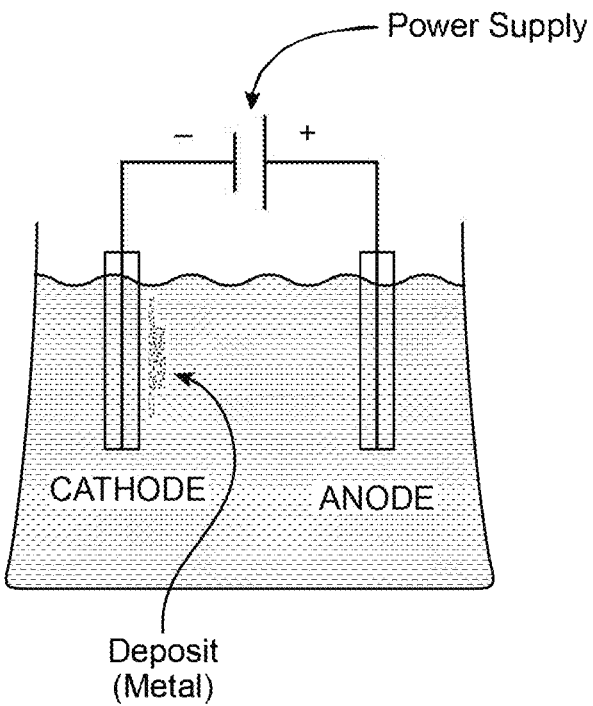
FIG. 8 shows a simplified view of the separation of metal from liquid through the application of a potential difference.

FIG. 8 shows subsequent recovery of metals in liquid, through application of a potential difference between an anode and a cathode.

In a similar manner, a piece of lead can be introduced in order to selectively precipitate copper. The lead piece may be 50% in weight in respect to the total weight of the liquid.

The solution may then be filtered. Powder obtained from this filtering will be enriched in copper. Leftover lead will be in a single piece.

Solid tin may then be introduced to the liquid solution. The tin piece could be 5% in weight of the total weight of the liquid. This will cause lead to precipitate.

The solution should then be filtered. Powder obtained from the filtering may be enriched in lead, any leftover tin will be in a single piece. The solution will still contain all other metallic elements.

A solid piece of iron may be introduced to the liquid solution. The iron piece may be 5% in weight of the total weight of the liquid. This will cause tin to precipitate.

The solution should then be filtered. Powder obtained from the filtering may be enriched in tin. Leftover iron may be in a single piece.

In the manner described above, successive rounds of:

metal introduction to liquid→precipitation→filtering-→liquid, may ultimately result in depletion of the main metals contained in a solar panel.

One or more precipitations take place in a time of between about 2-48 hours. One or more precipitations may take place at room temperature.

In particular embodiments, the pH of the solution may be between about 0-7. Agitation may assist in processing. Vacuum filtering could optionally be used to separate the solid and liquid at various stage(s).

According to various embodiments, electrowinning may be employed for material separation, alone or in combination with other techniques. Electrowinning uses an anode and a cathode.

A current is applied so that the metal of interest (e.g., Ag, Cu, Sn, Pb) can reduce, and thereby be deposited, on the cathode. Cathodes and anodes comprising various materials may be used. Examples can include but are not limited to: graphite, platinum, titanium, stainless steel, copper, lead, lead-antimony alloy, nickel, and gold In particular embodiments, electrowinning may be performed under one or more of the following conditions.

current: about 25-500 A/m$^2$ concentration of metals in the solution: 0.001-20% potential difference between the cathodes and anodes could be about 0.2-4.0 V vs SHE (Standard Hydrogen Electrode)

process time: may be between about 0.5-48 hours, depending on the initial concentration of metals in the solution.

Membranes may optionally be employed. The use of membranes can assist the process by blocking further ions that are in solution from depositing in the cathode.

The electrowinning process can be performed in a variety of cells. Such cells may or may not include the use of membranes and diaphragms. If used, membranes can have cationic, anionic, or bipolar selectivity.

Precipitation of silver nitrate can be achieved by the addition of sodium hydroxide. According to particular embodiments, about 5 g of sodium hydroxide may be added for about every 100 g of metal rich solution.

Silver hydroxide can precipitate as a solid. The silver can be recovered by filtering the solid from the liquid solution.

In some embodiments, copper can be recovered in the form of copper nitrate, by the addition of about 30 g of sodium hydroxide for about every 100 g of solution. The copper nitrate can be recovered by filtering the solid from the liquid solution.

According to certain embodiments, lead nitrate can be recovered by adding sulfuric acid to the solution. For example, about 5 grams of sulfuric acid could be added for about every 100 g of solution. The lead nitrate can be recovered by filtering the solid from the liquid solution.

Particular embodiments can result in metal having the purity below.

| Ag Metal | 99.99% | 99.5% | 98% |
|---|---|---|---|
| Cu Metal | 99.99% | 99.89% | 98% |
| Pb Metal | 99.99% | 99.5% | 95% |
| Tin Metal | 99.99% | 99.5% | 95% |

EXAMPLE

A specific example is now described. The following materials were used.

HNO3 65% w/w;

KOH 0.25 and 0.025 mol/L;

Magnetic Stirrer;

Flat-bottom flask;

Graham condenser;

Sieves mesh #4, #9, #16, #35 and #60;

Syringe filters;

Gas scrubbers;

Riffle splitter.

For this particular example, pre-processed materials resulting from electrostatic separation-herein referred to as Electroconductive Fractions (ECFs)—were produced.

ECF produced from CS6K-275P;

ECF produced from solar modules where the glass has been removed.

Preparation of the pre-processed material according to the exemplary embodiment, involved the following.

(1) Cutting the module into smaller sizes;

(2) Milling the module in a knife mill. A 10 mm screen sieve separated the material over 2 h. The material that did not pass the screen sieve was subjected to further milling in a finer knife-mill with a 5 mm screen sieve. The rotation speed of the finer knife mill was set to 1500 rpm and the feed was milled until all of the material passed the sieve (about 30 min). Both materials were mixed.

(3) The milled module was subjected to drying in a furnace at 85 to 90° C. for 2 hours.

(4) The dried milled module was submitted to electrostatic separation (ES) according to the parameters presented below.

| Parameter | Value |
| --- | --- |
| Electric potential difference | 30 kV |
| Vibratory feeder speed | 6-12 kg/h |
| Rotation speed | 26 rpm |
| Ionizing electrode position | 5.5 cm |
| Lifting electrode position | 11 cm |
| Splitter angle (conductor) | 9° |
| Air Humidity | <60% |

Smaller yet representative samples were taken from the ECF using a riffle splitter.

Leaching was carried in 500 ml flat-bottom flasks using dilute nitric acid. Operational conditions such as nitric acid concentration ([HNO3]), solid-liquid ratio (S/L), and time (t) were tested under the following conditions, at room temperature.

| | 1 | 2 | 3 | 4 |
| --- | --- | --- | --- | --- |
| [HNO3] mol/L | 0.75 | 1.5 | 3 | 4.5 |
| S/L | 1/5 | 1/10 | 1/20 | 1/30 |
| t (h) | 1; 2; 3; 4; 5; 6 | 1; 2; 3; 4; 5; 6 | 1; 2; 3; 4; 5; 6 | 1; 2; 3; 4; 5; 6 |

Aliquots between 0.5 and 2 mL were taken from the leaching solution every hour for the first six hours. Chemical composition of the aliquots was determined through the use of Inductively Coupled Plasma—Atomic Emission Spectrometry (ICP-AES).

After leaching, the liquid and solid fractions were separated by filtering. The liquid fraction was discarded.

The solid fraction was placed in a furnace to dry at 50° C. for a minimum of 24 h. The dried solid fraction was then weighed, mixed and separated in a series of sieves (e.g., #4, #9, #16, #35 and #60).

The material in each compartment was analyzed by X-Ray Fluorescence (XRF). A weighted average was taken.

Gas scrubber leaching in this example is now described. The following table gives an overview of the conditions in which leaching with gas scrubbers were tested with four experiments, using the following three different gas scrubber configurations:

Configuration 1: flat-bottom flask connected to a condenser and two gas scrubbers in series.

Configuration 2: inward protrusions and a porous stone at the end of the internal tubing, to favor interactions between liquid and solid and increase gas dissolution into the liquid.

Configuration 3: the primary scrubber had a wider porous stone at the end of the internal gas tube with smaller pore size, thus producing significantly smaller bubbles; the model with protrusion was used as a secondary; a tertiary scrubber was also added to the series and was used mainly as a pH indicator.

| Experiment | Configuration | HNO3 (mol/L) | S/L | Material |
| --- | --- | --- | --- | --- |
| GS1.1 | #1 | 3 | 1/5 | w/o glass |
| GS2.1 | #2 | 3 | 1/5 | w/glass |
| GS3.1 | #2 | 3 | 1/5 | w/o glass |
| GS4.1 | #3 | 4.5 | 1/5 | w/glass |

In all scrubbers deionized water was used as a scrubbing solution. Air was pumped into the reactor in order to favor the production of NO2, which will react with water to form HNO3 and HNO2, according to Equation 1.

$$2\ NO2+H2O \rightarrow HNO2+HNO3 \tag{Eq. 1}$$

HNO2 can also be oxidized with air according to Equation 2.

$$2\ HNO2+O2 \rightarrow 2\ HNO3 \tag{Eq. 2}$$

Temperature was measured with a thermometer on the surface of the solution every 5 min throughout the experiments.

After the leaching reaction was over, a sample of each solution was taken and titrated with KOH 0.25 or 0.025 mol/L to measure the pH, seeing that the pH in the scrubbing solutions is directly related to the amount of dissolved NOx.

Thiosulfate leaching was also performed, for comparison with HNO3. Leaching was conducted over 4 h, the results were compared with HNO3 at the 3rd hour of leaching.

Thiosulfate leaching followed the same methodology and the same S/L of ⅕ as the best HNO3 leaching condition. The thiosulfate leaching solution was prepared by mixing 1 mol/L NH4OH, 0.05 mol/L CuSO4 and 0.2 mol/L Na2S2O3. The final pH was measured between 10 and 10.5.

Nitric acid results are now described. Based on the ICP results, the best yield for the digestion time of 2 h was verified under 3 mol/L and ⅕ S/L (ECF10) in which 0.4319 g Ag, 19.35 g Cu, 1.88 g Al, 1.21 g Sn and 1.11 g Pb, per 100 g of the pre-processed starting material were extracted.

A maximum leached mass was verified under 4.5 mol/L and ¹⁄₁₀ S/L (ECF7), when 28.63% of the original sample was dissolved. A minimum leached mass was verified under 0.5 mol/L and ⅕ S/L (ECF4), when 6.54% of the original sample was dissolved. A maximum amount of 0.48% Ag was extracted under 4.5 mol/L and ⅓₀ S/L (ECF9) after 4 h. A maximum amount of 30.85% Cu was extracted under 3 mol/L and ⅓₀ S/L (ECF1) after 24 hours.

Generally, regarding the parameters, the following observations were made.

The greater the S/L, the faster the metals are leached.

For the tested S/L, 3 and 4.5 mol/L, HNO3 seem to have similar effects on leaching. Below 2 mol/L acid concentration may not leach all the metals.

The time of 2 h seems to be enough to mostly dissolve the metals, as long as S/L and [HNO3] are at described levels.

The solution heats during leaching. This heat may auto-catalyze the leaching reaction, improving leaching kinetics.

In this sense, parameter optimization should be made targeting greater S/L (increases heat release) and greater HNO3 concentrations.

XRF results are now described. The XRF technique may be susceptible to sampling issues, which could lead to an analysis of an unrepresentative portion of the solid fraction. To avoid this issue, samples that will undergo XRF analysis may be submitted to sieving separation and/or milling, in order to maximize sample representativeness.

Figures 9, 10:
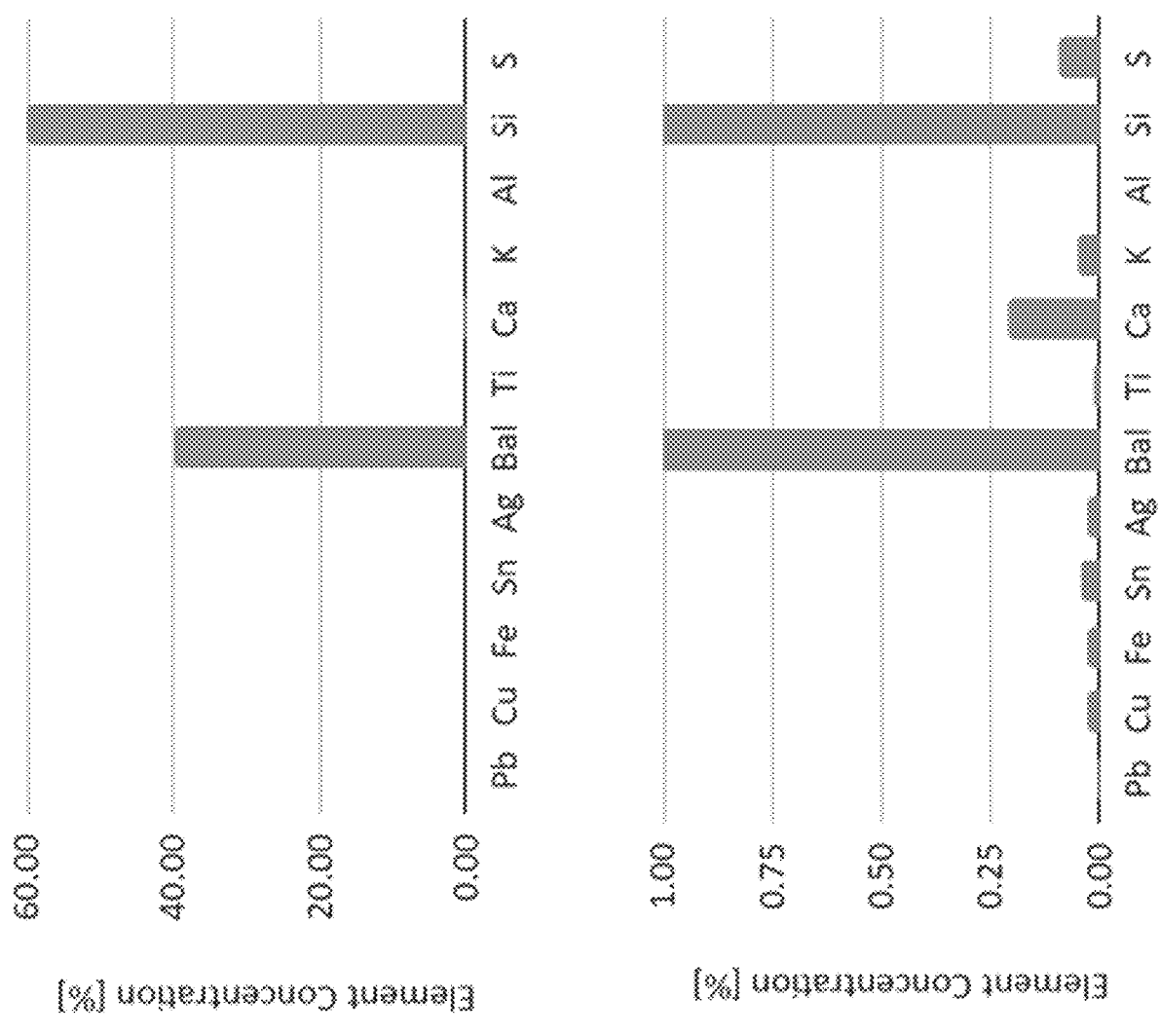
FIG. 9 shows results for analysis of compositions after leaching.
FIG. 10 is a close-up of FIG. 9.

FIG. 9 shows the weighted XRF averages for the ECF composition after leaching. It is essentially composed of 60% Si and 40% Balance.

FIG. 10 is a close-up of FIG. 9. FIG. 10 shows that the concentration of Pb, Sn, Cu and Ag are in the range of 30 to 400 ppm.

The following table shows comparison between liquid fraction ICP results and leached ECF XRF results.

|  | Ag | Cu | Sn | Pb |
|---|---|---|---|---|
| ECF10-3M; 1/5; 2 h | 0.43% | 19.35% | 1.21% | 1.11% |
| Leached ECF XRF | 0.03% | 0.03% | 0.04% | 0.00% |
| Element Removal | 93.35% | 99.84% | 96.70% | 99.75% |

When compared with the ICP results, for the best condition (⅕, 3M), this represents reductions of 93.35% for Ag, 99.84% for Cu, 96.70% for Sn and 99.75% for Pb.

An XRF analysis of the black powder present in several solutions, shown in the table below, indicates that it is a silicon and copper based material.

| SAMPLE | Pb | Cu | Fe | Sn | Ag | Bal | Ti | Ca | K | Al | S | Si |
|---|---|---|---|---|---|---|---|---|---|---|---|---|
| Syringe Filter | 0.61 | 15.11 | 2.10 | 0.56 | 0.08 | 19.12 | 0.09 | 0 | 0 | 1.93 | 12.47 | 47.83 |

The amount of sulfur may be related to the filter.

Results of the gas scrubber testing are now described. The following table shows gravimetric leaching data.

| Experiment | Material | Initial Mass (g) | Final Mass (g) | Leached Mass (g) | Leached Fraction (%) |
|---|---|---|---|---|---|
| GS1.1 | w/glass | 19.1026 | 14.8835 | 4.2191 | 22.09 |
| GS2.1 | w/glass | 17.2269 | 15.7152 | 1.5117 | 8.78 |
| GS3.1 | w/o glass | 15.8665 | 12.4552 | 3.4113 | 21.50 |
| GS4.1 | w/o glass | 18.7197 | 16.7518 | 1.9679 | 10.51 |

The following table shows composition leaching data-relative leached mass of each element in respect to the mass of material leached.

Relative Mass (%)

| | Relative Mass (%) | | | | | |
|---|---|---|---|---|---|---|
| Experiment | Ag | Al | Cu | Fe | Sn | Pb |
| GS1.1 | 0.485 | 2.742 | 89.612 | 0.164 | 0.091 | 6.906 |
| GS2.1 | 0.541 | 5.700 | 85.629 | 0.149 | 4.091 | 1.045 |
| GS3.1 | 0.444 | 3.097 | 18.490 | 1.296 | 0.939 | 1.219 |
| GS4.1 | 0.972 | 11.325 | 82.139 | 0.834 | 0.109 | 4.622 |

It can be seen that the materials used possessed different compositions and yielded varying results. This complicates making direct comparison of the efficiency of each setup.

The first system configuration produced bubbles in the primary and secondary scrubbers. Only a pH test with a pH strip was carried out.

The result showed that the pH in both compartments were similar. The strips indicated it to be around 2, which translates into a nitrate concentration on the order of 0.001 to 0.01 mol/L.

The scrubber used as a primary in configuration #2 produced medium-sized bubbles. The following table shows deduced NO3− content by titration or Ionic Chromatography (IC) of gas scrubber systems.

| Experiment | NO3- content Solution (mol) | NO3- content Primary (mol) | NO3- content Secondary (mol) | NO3- content Tertiary (mol) | NO3- Sum | [NO3-] Nitric Acid (mol) |
|---|---|---|---|---|---|---|
| GS1.1 | N/A | N/A | N/A | N/A | N/A | N/A |
| GS2.1 | N/A | 0.0028 | 0.0015 | N/A | 0.0043 | 0.4376 |
| GS3.1 | N/A | 0.0076 | 0.0005 | N/A | 0.0081 | 0.4376 |
| GS4.1 | 0.4836 | 0.0089 | 0.0014 | 0.0006 | 0.4938 | 0.4376 |

It can be seen that the pH in the primary and in the secondary scrubbers were 1.396 and 1.859, respectively.

In this case of GS3.1, there was an increase in H+ concentration on the primary scrubber, and a decrease on the secondary scrubber in respect to the previous test. The values were still in the same order of magnitude.

On the fourth test, the configuration was changed again, with similar results.

The amount of nitrate that was still in the leachate, was analyzed through Ionic Chromatography (IC). The results showed that there was 0.4836 mol of nitrate in the leachate, which is higher than the amount of nitrate in the diluted acid that is used a leachant (0.4376 mol).

Temperature is now discussed. The following table shows temperature measurements over time during gas scrubber leaching experiments.

| Time (min) | Temperature GS2.1 (° C.) | Temperature GS3.1 (° C.) | Temperature GS4.1 (° C.) |
|---|---|---|---|
| 0 | 30 | 25 | 30 |
| 5 | 30 | 33 | 31 |
| 10 | 29 | 37 | 32 |
| 15 | 29 | 38 | 34.5 |
| 20 | 28 | 37 | 37 |
| 25 | 28 | 33 | 40 |
| 30 | 29 | 31 | 37.5 |

The reaction of GS2.1 did not produce a measurable amount of heat. However this was not the case for reactions of GS3.1 and GS4.1, which produced heat from the start of the reaction.

The highest temperatures of 38° C. and 40° C. were observed at 15 min and 25 min (GS3.1 and GS4.1, respectively). This indicates that the kinetics may be fast, since the beginning of the reaction and that the majority of the reactants should have been consumed once the system starts to cool down.

The use of a pH indicator scrubber is now described. Considering the addition of the tertiary scrubber, it can be said that: at first the initial pH was slightly alkaline which made the solution red in color.

However, as the leaching reaction went on, there was a decrease in pH, which was indicated by the solution turning yellow. At the end of the reaction, the solution pH did not cross the 4.1 to 3.3 pH mark as it would have turned red once more.

It is noted that filtering the leaching solution yielded a clear blue solution that did not contain the fine black powder previously observed. Considering that other experiments have been made with different materials, the absence of the black Si powder may be related to the lowered period in which the reaction took place.

Results with thiosulfate leaching show that it may be less effective than HNO3 under certain circumstances.

In conclusion, the example demonstrates that HNO3 is an effective reagent to leach metals present in a starting material comprising a used solar module that has been pre-processed. Increasing the S/L improves leaching kinetics.

The formation of the black powder in some occurrences, has been verified to be Si-based, rather than Ag-based. The formation of this powder seems to be related to the reaction length, rather than to the material or to the method Material composition did not correspond to the expected 83:10:7 ratio of Cu:Sn:Pb, but rather to 89:6:5. Temperature appears to peak between 10 and 30 min from the start of the reaction, which should indicate the depletion of reactants.

Variations in gas scrubber setup may enhance gas dissolution in the scrubber. One such variation is the addition of porous stones and glassware with protrusions to favor NOx dissolution.

In addition to those shown in FIGS. 2 and 3, other process flows for handling of materials for used solar module recycling, may be used. FIGS. 11-14 show sample process flows for alternative embodiments.

Figures 11, 12:
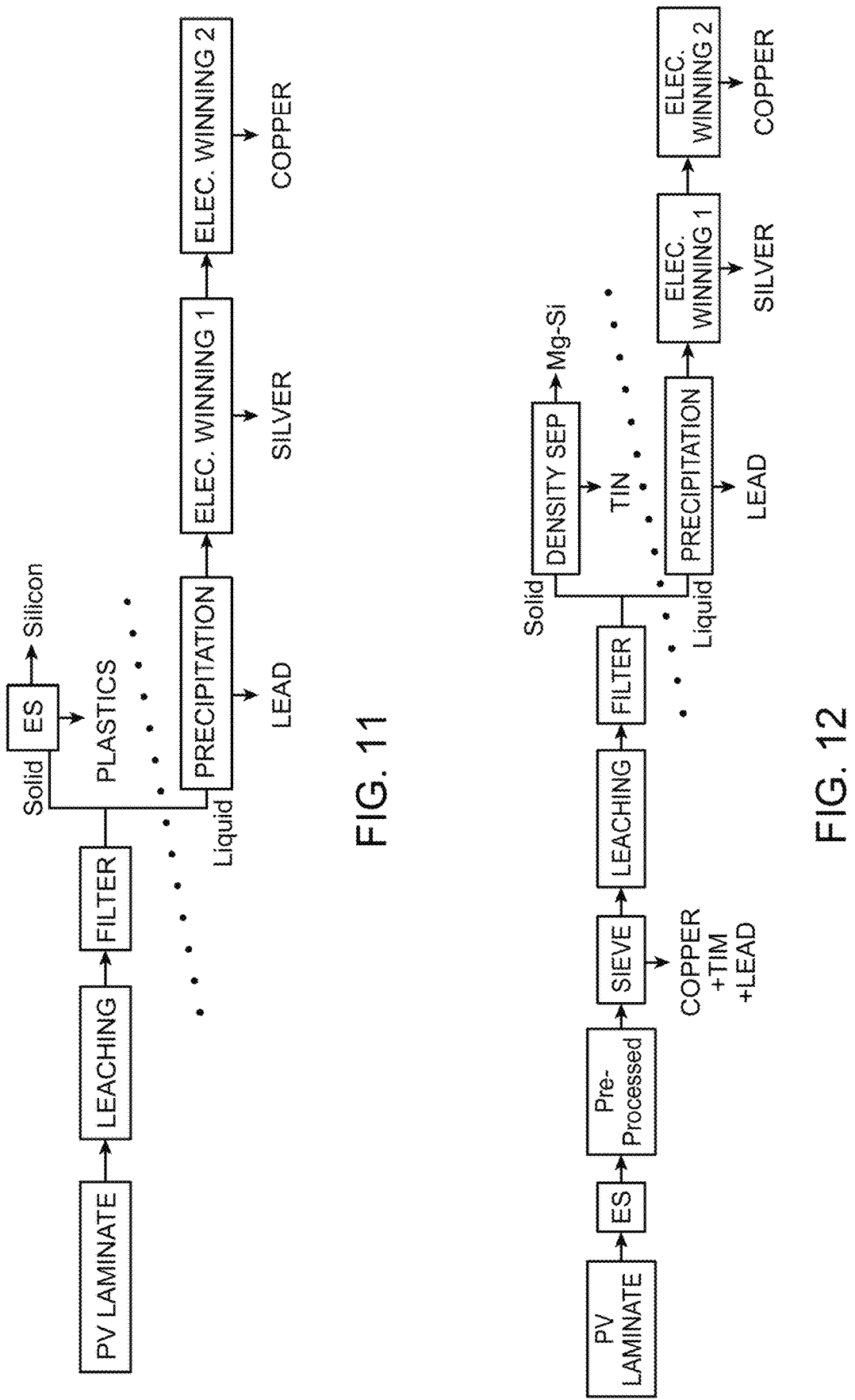
FIGS. 11-14 show flow diagrams according to alternative embodiments.

For example, FIG. 11 shows a flow diagram according to an alternative embodiment. Here, ES refers to electrostatic separation. In this alternative embodiment, a PV laminate (i.e., a PV panel without the frame and junction box) is subjected to leaching and filtering and only afterwards are the solids from the filtered mechanically processed.

FIG. 12 shows a flow diagram according to an alternative embodiment. Here, Mg—Si stands for metallurgical grade silicon.

In particular, a number of different grades of silicon exist. The following lists the purity of a number of different grades of crystalline silicon that may be recovered from a recycled used solar module according to embodiments.

| Crystalline Silicon Grade | Purity |
|---|---|
| Metallurgical | 98 to 99% |
| Chemical | 99-99.99% |
| Electronic | 99.9999% |
| Solar | 99.99999% |

Density separation refers to processes that separate materials based upon the property of density. Density separation can utilize various media, including liquids and/or gas (including air). Density separation can utilize centrifugation.

One form of density separation involves air flow separation. Such air flow separation can be performed utilizing a shaking table that is vibrated at particular frequenc(ies).

In the alternative embodiment shown in FIG. 12 the pre-processed material is first sieved so that copper can be recovered with its tin-lead coating and the leaching procedure can take place with a significant reduction (in the order of 80-90%) in the amount of leaching agent necessary.

Figures 13, 14:
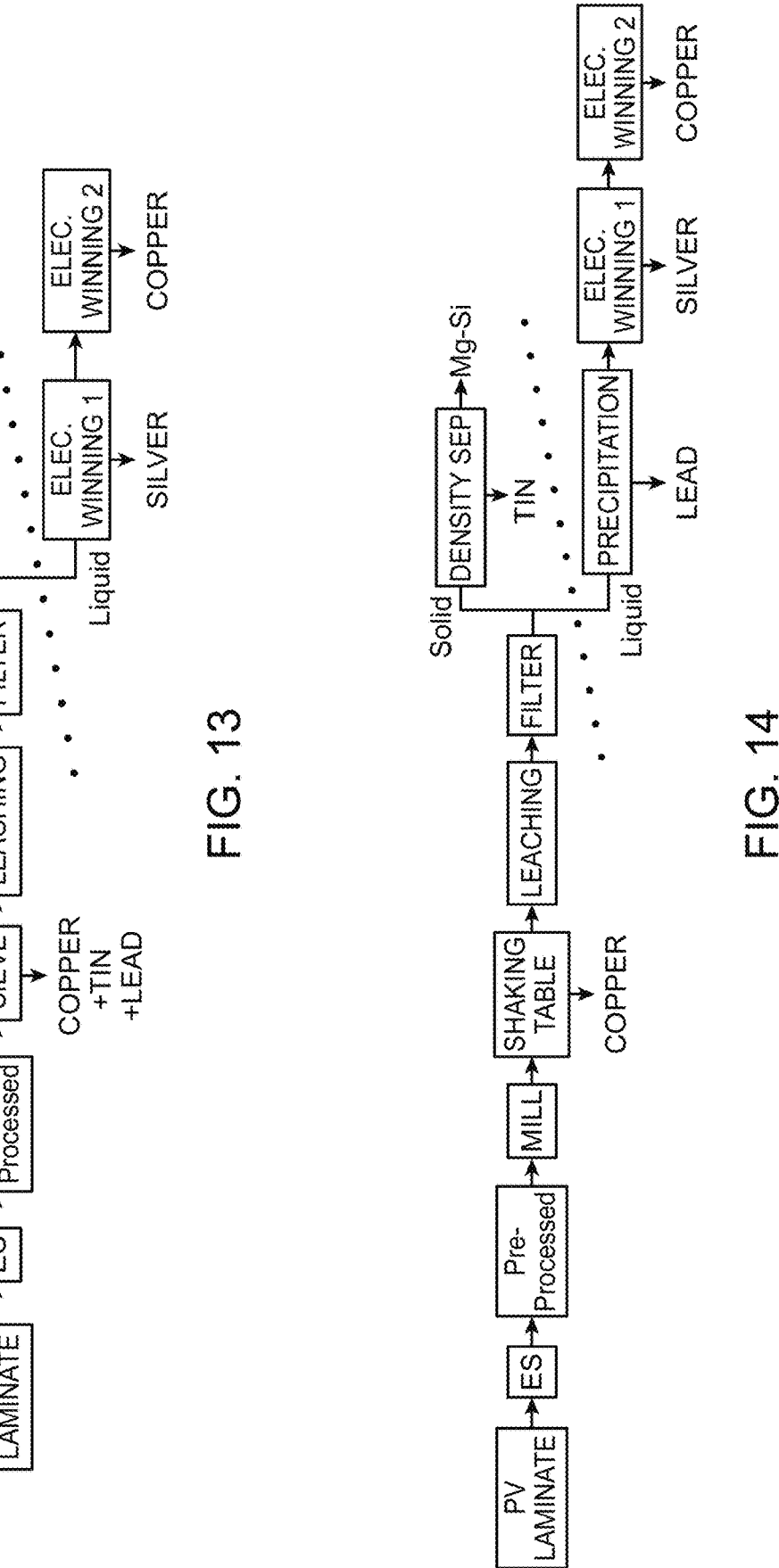

FIG. 13 shows a flow diagram according to an alternative embodiment. Here, in this embodiment a situation similar to that in FIG. 12 occurs.

However, when the removal of copper through sieving is greater than 99%, the post recovery of tin and lead may not be required.

FIG. 14 shows a flow diagram according to an alternative embodiment. According to this particular embodiment, the use of a mill involves physical separation to produce particles of 2 mm or smaller.

In the alternative embodiment of FIG. 14, the pre-processed material is first milled as to reduce the particle sizes and liberate the copper from the tin-lead coating. This copper can be then separated with a density separation technique (e.g. shaking table or air flow separator).

The remaining material can then be leached. Leaching is favored given the smaller particle size obtained after milling.

As with the case in FIG. 12, the leaching procedure can take place with a reduction (in the order of 80-90%) in the amount of leaching agent. This can be due to the pre removal of copper.

The solution is then filtered. The solid solution is then separated again using density separation to obtain pure tin and pure silicon. The liquid is first subjected to precipitation to obtain lead, followed by a first stage electrowinning for silver and a second stage electrowinning for copper.

It is noted that a number of techniques may be employed alone or in combination in order to separate metal ion(s). One approach is a liquid-liquid extraction method to separate metal ions from an aqueous solution using an organic solvent.

Parameters for liquid-liquid extraction can include one or more of pH, extractant concentration, and aqueous to organic phase ratio. Particular embodiments may employ one or more of the following.

pH range: 0-6.

Extractor agents used include:

LIX 84-I,

LIX 984N, tributylphosphate (TBP), tri-n-octylamine (TOA).

Organic solvents include: kerosene, xylene,

Extractant concentration: 0.05-2 mol/L.

Aqueous to organic phase ratio: between 2:1 and 1:10.

Temperature: 0-90° C.

Mixing time: 1-20 min.

Number of stages: initial extraction stage, followed by one or more stripping stages.

Another approach to separating metal from liquid is ion exchange. Ion exchange uses a solid-liquid separation method to remove metal ions from an aqueous solution using a solid ion exchange resin.

Particular ion exchange parameters can include pH, resin type, and metal ion concentration. Specific embodiments may employ one or more of the following.

pH range: 1-10.

Resin: strong acid cation exchange resin (SAC), strong base anion exchange resin (SBA), chelating resins.

Ion exchange processes can be used when the concentration of copper, lead, tin and silver is in the range of 10-10,000 ppm.

Bed depth of 5-150 cm.

Flow rate in the range of 0.5-20 m³/h.

The following acids are used in the regeneration of these resins: HCl, H2SO4, HNO3, HBr, HI, HClO3, HClO4.

Still another approach to separating metal from liquid is precipitation. Precipitation uses a chemical reaction to precipitate metal ions out of solution as a solid.

Parameters for precipitation can include pH, reagent type and concentration, and temperature. Specific embodiments may employ one or more of the following.

The pH in which the precipitation of Ag, Cu, Sn and Pb take place is between 3 and 9.

The following reagents can be used to precipitate Ag, Cu, Sn and Pb: hydroxides, carbonates, sulfides, oxides, and complexing agents.

The concentration of the precipitation reagent is in the range of 0.05-5 mol/L.

Precipitation may occur at a temperature in the range of 0-80° C.

Precipitation reaction may take place over 1-20 min.

The reaction can be assisted by agitation of the media by means of mechanical or magnetic stirring or gas bubbling.

The metals can be filtered from the solution by various means such as press filtering, centrifugal separation or vacuum filtering.

Electrolysis is another technique used for separation. Electrolysis uses an electric current to extract metal ions from an aqueous solution.

Depending upon the specific embodiment, parameters for electrolysis can include current density, electrode material, and electrolyte concentration. Particular embodiments may feature one or more of the following.

Current densities between 25 and 500 A/m² are used to recover Ag, Cu, Sn and Pb.

The following are examples of materials that can be used to compose the anodes and cathodes to recover copper, lead, tin and silver: graphite, platinum, titanium, stainless steel, copper, lead, lead-antimony alloy, nickel and gold.

Copper, lead, tin and silver are recovered in concentrations between 10-100.000 ppm.

A bipolar or membrane cell can be used in the electrolysis process. The bipolar cell can have a diaphragm to separate the electrodes. The membrane cell can be separated by a cationic, anionic or bipolar membrane.

A potential difference between 0.5 and 3 V vs. SHE (Standard Hydrogen Electrode) is measured between the cathode and anode during electrolysis of copper, lead, tin and silver.

It may take between 0.5-48 h for electrolysis to be completed.

Adsorption is yet another technique that may be employed for separation. Adsorption adopts a solid-liquid separation method to remove metal ions from an aqueous solution using a solid adsorbent material.

Adsorption parameters can include one or more of pH, adsorbent type and concentration, and metal ion concentration. Particular embodiments may feature one or more of the following.

The pH used in the adsorption stage of copper, lead, tin and silver varies between 1 and 10.

The following are absorption reagents that can be used in the process to recover copper, lead, tin and silver: amine-based extractants, EDTA, NTA, cyanide and thiourea.

The concentration of the adsorption reagents can vary between:

0.02-10% w/v when amine-based extractants, cyanide or thiourea are used.

0.05-3 mol/L when EDTA or NTA are used.

Desorption of metals can be made with the use of:

Strong acids: H2SO4, HCl, HNO3, HClO3, HClO4, HBr, HI.

Reducing agents: H2S, NaHS, SO2, Fe(II), H2.

The desorption agents can be used in the following concentration ranges of 0.5-10%, 0.05-2 mol/L and 0.5-20 atm.

Adsorption processes can be used when the concentration of copper, lead, tin and silver is between 10 and 100.000 ppm.

A temperature between 0 and 80° C. can be used during the adsorption processes.

A mixing time of 1 to 20 min is necessary to properly mix the reagents in the solution.

Mixing can be assisted by mechanical or magnetic stirring and by gas bubbling.

Membrane separation is still another technique that may be employed. Membrane separation utilizes a membrane to separate metal ions from an aqueous solution by selective permeation.

Parameters for membrane separation can include one or more of pH, membrane material and pore size, and metal ion concentration. Depending upon the particular embodiment, membrane separation may feature one or more of the following.

Membrane separation of copper, lead, tin and silver occur under the pH range of 1-6.

Polymeric or ceramic membranes with a pore size between 0.05-5 microns can be used.

Membrane separation processes can be used when the concentration of copper, lead, tin and silver is in the range of 10-100.000 ppm.

Membrane separation can be carried out under 0-90° C.

A transmembrane pressure between 0.05-10 bar can be applied.

A flow rate ranging from 0.1-10 L/min/m² can be used.

Membranes can be periodically cleaned when an efficiency drop is observed. The cleaning frequency may be related to the parameters chosen, and can occur on the basis of hours, days, or weeks. Cleaning can be is carried out using:

Acidic solutions such as H2SO4 and HCl.

Alkaline solutions such as KOH.

Oxidizing agents such as Cl– or H2O2.

Chelating agents such as EDTA or NTA.

Detergents such as sodium dodecylbenzenesulfonate or Tween-20.

Bioleaching represents still another approach that may be used to achieve separation. Bioleaching uses microorganisms to extract metals from minerals or ores.

Parameters for bioleaching can include one or more of pH, temperature, microbial strain, and nutrient availability. Depending upon the particular embodiment, the following could be used.

pH range of 0.5-5.

temperature in the range of 10-50° C.

Bioleaching can be achieved using one or more of the following species or strains of microorganisms: acidithiobacillus ferrooxidans, acidithiobacillus thiooxidans, Leptospirillum ferrooxidans, and Sulfobacillus.

A nutrient-rich solution containing sulfur, oxygen or carbon for the reaction to take place.

A solid to liquid ratio between 1:1 and 1:20 (w/v) can be used.

Mixing can be assisted by (mechanical/magnetic) stirring and/or gas bubbling.

It may take between 0-10 days to recover metals.

Clause 1A. A method comprising:

receiving a pre-processed mixture prepared from a used solar module and comprising single crystalline silicon and silver;

leaching the mixture with a solvent;

following the leaching, separating a liquid phase including silver from the mixture;

exposing the liquid phase to electrical energy; and recovering silver in the solid phase from the liquid phase.

Clause 2A. A method as in Clause 1A wherein recovering the silver comprises electrowinning.

Clause 3A. A method as in any of Clauses 1A or 2A wherein the solution comprises an inorganic acid.

Clause 4A. A method as in Clause 3A wherein the inorganic acid comprises at least one of HNO3 and H2SO4.

Clause 5A. A method as in any of Clauses 1A, 2A, 3A, or 4A wherein the solution comprises Copper (I) Thiosulfate (Cu2S2O3).

Clause 6A. A method as in any of Clauses 1A, 2A, 3A, 4A, or 5A further comprising recycling the liquid phase after recovering the silver.

Clause 7A. A method as in any of Clauses 1A, 2A, 3A, 4A, 5A or 6A wherein the liquid phase is separated from the mixture by filtering.

Clause 8A. A method as in Clause 7A wherein the filtering comprises at least one of press filtering, filtering using an inverse rotating screw, and/or filtering using a membrane.

Clause 9A. A method as in any of Clauses 1A, 2A, 3A, 4A, 5A, 6A, 7A, or 8A wherein the coarse mixture is prepared following removal of a component of the solar module.

Clause 10A. A method as in Clause 1A wherein the component is selected from at least one of a junction box, a frame, a cable, or a backsheet.

Clause 11A. A method as in Clause 9A wherein the pre-processed mixture is prepared by physical separation.

Clause 12A. A method as in Clause 11A wherein the physical separation comprises at least one of shredding and sieving.

Clause 13A. A method as in Clause 12A wherein the sieving is performed with a mesh size of between about 16-60 mm.

Clause 14A. A method as in any of Clauses 12A or 13A wherein the pre-processed mixture comprises a first fraction of the sieving, the method further comprising separating a metal from a second fraction of the sieving.

Clause 15A. A method as in Clause 14A wherein separating the metal comprises a chemical separation.

Clause 16A. A method as in Clause 15A wherein the chemical separation comprises exposing the second fraction to an acid.

Clause 17A. A method as in Clause 16A wherein the acid comprises hydrochloric acid.

Clause 1B. A method comprising:

receiving a pre-processed mixture prepared from a used solar module and comprising a photovoltaic material and a first metal;

leaching the pre-processed mixture with a liquid;

following the leaching, performing a first separation of a first fraction comprising a first solid phase, from a second fraction comprising a first liquid phase; and performing a second separation of separating a third fraction from the first solid phase.

Clause 2B. A method as in Clause 1B wherein the second separation comprises density separation.

Clause 3B. A method as in any of Clauses 1B or 2B wherein the third fraction comprises the photovoltaic material.

Clause 4B. A method as in any of Clauses 1B, 2B, or 3B wherein the second separation comprises applying electrical energy.

Clause 5B. A method as in any of Clauses 1B, 2B, 3B, or 4B wherein the second separation comprises electrostatic separation.

Clause 6B. A method as in any of Clauses 1B, 2B, 3B, 4B, or 5B wherein the photovoltaic material comprises crystalline silicon.

Clause 7B. A method as in Clause 6B wherein the crystalline silicon comprises metallurgical grade silicon.

Clause 8B. A method as in any of Clauses 6B or 7B wherein the crystalline silicon comprises chemical grade silicon.

Clause 9B. A method as in any of Clauses 6B, 7B, or 8B wherein the crystalline silicon comprises semiconductor grade silicon.

Clause 10B. A method as in any of Clauses 6B, 7B, 8B, or 9B wherein the crystalline silicon comprises a dopant.

Clause 11B. A method as in any of Clauses 6B, 7B, 8B, 9B, or 10B wherein the crystalline silicon comprises a trace metal.

Clause 12B. A method as in any of Clauses 1B, 2B, 3B, 4B, 5B, 6B, 7B, 8B, 9B, 10B or 11B wherein the second separation comprises density separation.

Clause 13B. A method as in any of Clauses 1B, 2B, 3B, 4B, 5B, 6B, 7B, 8B, 9B, 10B, 11B, or 12B wherein the second separation comprises centrifugation.

Clause 14B. A method as in any of Clauses 1B, 2B, 3B, 4B, 5B, 6B, 7B, 8B, 9B, 10B, 11B, 12B, or 13B wherein the second separation comprises air flow separation.

Clause 15B. A method as in any of Clauses 1B, 2B, 3B, 4B, 5B, 6B, 7B, 8B, 9B, 10B, 11B, 12B, 13B, or 14B wherein the second separation utilizes a shaking table.

Clause 16B. A method as in any of Clauses 1B, 2B, 3B, 4B, 5B, 6B, 7B, 8B, 9B, 10B, 11B, 12B, 13B, 14B, or 15B wherein the first separation comprises sedimentation and decanting.

Clause 17B. A method as in any of Clauses 1B, 2B, 3B, 4B, 5B, 6B, 7B, 8B, 9B, 10B, 11B, 12B, 13B, 14B, 15B, or 16B wherein the first separation comprises distillation.

Clause 18B. A method as in any of Clauses 1B, 2B, 3B, 4B, 5B, 6B, 7B, 8B, 9B, 10B, 11B, 12B, 13B, 14B, 15B, 16B, or 17B wherein the first separation comprises evaporation.

Clause 19B. A method as in any of Clauses 1B, 2B, 3B, 4B, 5B, 6B, 7B, 8B, 9B, 10B, 11B, 12B, 13B, 14B, 15B, 16B, 17B, or 18B wherein the first separation comprises centrifugation.

Clause 20B. A method as in any of Clauses 1B, 2B, 3B, 4B, 5B, 6B, 7B, 8B, 9B, 10B, 11B, 12B, 13B, 14B, 15B, 16B, 17B, 18B, or 19B wherein the first metal comprises at least one of silver, copper, tin, or lead.

Clause 21B. A method as in any of Clauses 1B, 2B, 3B, 4B, 5B, 6B, 7B, 8B, 9B, 10B, 11B, 12B, 13B, 14B, 15B, 16B, 17B, 18B, 19B, or 20B wherein the pre-processed material results from electrostatic separation.

Clause 22B. A method as in any of Clauses 1B, 2B, 3B, 4B, 5B, 6B, 7B, 8B, 9B, 10B, 11B, 12B, 13B, 14B, 15B, 16B, 17B, 18B, 19B, 20B, or 21B wherein the pre-processed material results from shredding of the used solar module.

Clause 23B. A method as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, or 22B wherein the pre-processed material results from sieving of the used solar module.

Clause 24B. A method as in any one of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, or 23B herein the pre-processed mixture comprises at least about 0.2% silver metal by weight.

Clause 25B. A method as in any one of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, 23B, or 24B wherein the pre-processed mixture comprises at least about between about 1% silver metal by weight.

Clause 26B. A method as in any one of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, 23B, 24B, or 25B wherein the pre-processed mixture comprises at least about 2% silver by weight.

Clause 27B. A method as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, 23B, 24B, 25B, or 26B further comprising performing a third separation of separating the first metal from the first liquid phase.

Clause 28B. A method as in Clause 27B wherein the third separation comprises applying electrical energy.

Clause 29B. A method as in any of Clauses 27B or 28B wherein the third separation comprises at least one of:
electrowinning; and
electrolysis.

Clause 30B. A method as in any of Clauses 27B, 28B, or 29B wherein the third separation comprises precipitation.

Clause 31B. A method as in any of Clauses 27B, 28B, 29B, or 30B wherein the third separation further comprises filtering or centrifugal separation.

Clause 32B. A method as in any of Clauses 27B, 28B, 29B, 30B, or 31B wherein the third separation comprises at least one of:
electrowinning;
precipitation;
electrolysis;
liquid/liquid separation;
adsorption;
membrane separation;
bioleaching;
ion exchange;
filtering;
density separation;
sedimentation and decanting;
distillation;
evaporation;
centrifugation.

Clause 33B. A method as in Clauses 27B, 28B, 29B, 30B, 31B, or 32B wherein the preprocessed mixture further comprises a second metal, the method further comprising:
performing a fourth separation after the third separation, to separate the second metal.

Clause 34B. A method as in Clause 33B wherein the fourth separation comprises at least one of:
electrowinning;
precipitation;
electrolysis;
liquid/liquid separation;
adsorption;
membrane separation;
bioleaching;
ion exchange;
filtering;
density separation;
sedimentation and decanting;
distillation;
evaporation;
centrifugation.

What is claimed is:

1. A method comprising:
receiving a pre-processed mixture prepared from a used solar module by delamination, the pre-processed mixture comprising optical glass, a photovoltaic material, and a metal;
leaching the pre-processed mixture with a liquid comprising an acid;
following the leaching, performing a first separation of a first fraction comprising a first solid phase, from a second fraction comprising a first liquid phase;
performing a second separation of separating a third fraction from the first solid phase, wherein the third fraction comprises an organic material; and
performing electrostatic separation,
wherein the pre-processed mixture is prepared from the electrostatic separation.

2. A method as in claim 1 wherein the delamination comprises thermal delamination.

3. A method as in claim 2 wherein the thermal delamination comprises heating.

4. A method as in claim 3 wherein the heating is performed in a furnace.

5. A method as in claim 3 wherein the heating is of a wire.

6. A method as in claim 1 wherein the organic material comprises polyolefin encapsulant or ethylene vinyl acetate.

7. A method as in claim 1 wherein the third fraction comprises a portion of the optical glass.

8. A method as in claim 7 wherein the optical glass is on a front side of the used solar module.

9. A method as in claim 1 wherein the pre-processing comprises glass removal.

10. A method as in claim 1 wherein the third fraction comprises a portion of the photovoltaic material.

11. A method as in claim 1 wherein the photovoltaic material comprises crystalline silicon.

12. A method as in claim 1 wherein the photovoltaic material comprises CdTe.

13. A method as in claim 1 wherein the second separation utilizes shaking.

14. A method as in claim 1 further comprising sieving.

15. A method as in claim 14 wherein the pre-processed mixture is prepared by the sieving.

16. A method as in claim 14 wherein the second separation utilizes the sieving.

17. A method as in claim 1 further comprising returning to the liquid, a result of scrubbing following the leaching.

18. A method as in claim 17 wherein the scrubbing utilizes a porous stone.

19. A method as in claim 17 wherein the scrubbing utilizes a glass protrusion.

20. A method as in claim 17 wherein the scrubbing utilizes a primary scrubber and a secondary scrubber.

*     *     *     *     *